United States Patent

[11] 3,630,791

[72] Inventors Hidehisa Yamagishi
 Kawasaki-shi;
 Hirokuni Mizuno, Kanagawa-ken; Masao Okawa, Irima-gun, Saitama-ken, all of Japan
[21] Appl. No. 795,733
[22] Filed Jan. 31, 1969
[45] Patented Dec. 28, 1971
[73] Assignee Nippon Kokan Kabushiki Kaisha
[32] Priority Feb. 10, 1968
[33] Japan
[31] 43/8071

[54] PROCESS OF SURFACE TREATMENT OF METALS
 7 Claims, No Drawings
[52] U.S. Cl. ...................................................... 148/6.2, 117/132 C
[51] Int. Cl. ..................................................... C23f 7/26

[50] Field of Search............................................ 148/6.2; 117/132, 161; 260/29.6, 78.5, 80.8, 85.5, 31.2, 31.8, 80

[56] References Cited
UNITED STATES PATENTS

| | | | |
|---|---|---|---|
| 2,531,408 | 11/1950 | D'Alelio...................... | 260/80.8 X |
| 2,583,325 | 1/1952 | D'Alelio...................... | 260/80.8 X |
| 2,873,212 | 2/1959 | Roester....................... | 260/80.8 X |

FOREIGN PATENTS

| | | | |
|---|---|---|---|
| 1,106,172 | 2/1965 | Great Britain................ | 260/80.8 |

Primary Examiner—Ralph S. Kendall
Assistant Examiner—Caleb Weston
Attorney—Flynn & Frishauf ABSTRACT: In a process of treating metals to form anticorrosive coatings, use is made of a treating solution containing a copolymer of itaconic acid and acrylonitrile and chromatic acid or chromates.

PROCESS OF SURFACE TREATMENT OF METALS

BACKGROUND OF THE INVENTION

This invention relates to surface treatment of metals, and more particularly to a novel process of surface treatment of steel plates and plated steel plates or sheets of various types.

Among various known anticorrosive treatment of steel plates or plated steel plates are included chemical treatments utilizing chromic acid or phosphate, and treating methods such as baking, electrolytic reduction, hot air drying or the like.

In carrying out the chemical treatments, it has been already proposed to incorporate chromate solution with various organic substances, especially resins to improve corrosion resistance. For example, as the resinous compositions, maleic acid-maleic acid anhydride copolymer, partial hydrolyzed product of polyvinyl acetate, alkyd resin and the like have been utilized.

However, in alkyd resin water dispersing copolymers are generally employed, to which an addition of dispersing agents such as surface active agents is made. For this reason, the prior methods are not always satisfactory, especially in paintability, corrosion resistance and in easiness of the chemical treatment operation.

When chromic acid alone is used, the surface properties of the treated plates, such as corrosion resistance and paintability, are poor so that such a method is deemed unpractical.

SUMMARY OF THE INVENTION

It is therefore an object of this invention to provide an improved process of treating metal utilizing chromic acid or a chromate.

This invention provides an improved process of surface treatment of metals, such as steel, comprising the process of applying to the surface of metals a treating solution containing a copolymer of itaconic acid and acrylonitrile, particularly water soluble copolymers, and chromic acid or a chromate and drying the treated surface, whereby to form anticorrosive coating.

Generally the concentration of chromic acid ranges from about 0.3 to 5 percent, but when considering the corrosion resistance, discoloration, the concentration of chromic acid of from 0.5 to 1.0 percent is preferred. Preferable degree of polymerization of the itaconic acid-acrylonitrile copolymer ranges from about 50 percent to 100 percent, 50–100 percent means that when the total amount of monomers of itaconic acid and acrylonitrile is set at 100, the total amount of copolymerized itaconic acid and acrylonitrile is 50–100 percent. Although suitable ratio of these monomers, i.e., itaconic acid and acrylonitrile is 40 to 80 percent of the former to 60 to 20 percent of the latter, their upper and lower limits may be varied within a few percent. The concentration of the resin is determined dependent upon the type of steel plates to be treated and their applications, but when using hot air drying, up to 10 percent of the resin may be incorporated.

While there is no definite lower limit, it is necessary to incorporate at least 1 percent in order to provide the desired corrosion resistance. The pH may be adjusted to 2.0 to 9.0 according to the surface condition of the plate being treated. Where it is desirable to increase pH by using alkali, caustic soda or caustic potash may be used depending upon the type of chromate used. Where the stability of the solution is important, it is advantageous to maintain pH of the treating solution at or near 7.0.

Although there is no limit on the temperature range of the treating solution, temperatures ranging from 50° to 80° C. are preferred in order to decrease the time of air drying and to improve the operation.

Of course, the treatment can also be carried out at room temperature with good results. The temperature of the hot air utilized in the final drying step may be such that the steel plate has a temperature of about 80° C. Although related to the treating speed, preferred temperature ranges from 80° to 200° C.

DESCRIPTION OF THE PREFERRED EXAMPLES

To illustrate the ratio of chromic acid and resinous composition in the solution as well as various conditions of treatment, the following specific examples are given, but are not to be construed as limiting in any way the scope and spirit of the invention.

EXAMPLE 1

| | | |
|---|---|---|
| Chromic acid | | 0.5% |
| Resin | itaconic acid 55% | 2% |
| | acrylonitride 45% | |
| pH | | 3.0 |
| Bath temperature | | 50° C. |
| Method of coating | | spraying |
| Temperature of hot air drying | | 100° C. |

EXAMPLE 2

| | | |
|---|---|---|
| Sodium bichromate | | 0.65% |
| Resin | | |
| | itaconic acid 45% | 5% |
| | acrilonitrile | |
| pH (adjusted by caustic soda) | | 6.0 |
| Bath temperature | | 70° C. |
| Method of coating | | spraying |
| Temperature of hot air drying | | 120° C. |

EXAMPLE 3

| | | |
|---|---|---|
| Potassium bichromate | | 1.04% |
| Resin | | |
| | itaconic acid 60% | 5% |
| | acrylonitrile 40% | |
| pH (adjusted by caustic soda) | | 5 |
| Bath temperature | | 70° C. |
| Method of coating | | dipping |
| Temperature of hot air drying | | 120° C. |

In each example, copolymers to be used are water soluble, and therefore the use of dispersing agent such as surface active agent is not required. After drying, the total quantity of the coating deposited upon the surface of the metal was 20–60 mg./m.$^2$ which is suitable to maintain excellent formability. Following table shows a comparison between the result of treatment of this invention and that of chromic acid alone.

1. SALT SPRAY TESTS FOR ORDINARY STEEL PLATES (percentage of forming red rust)

| | Time | | | | | | |
|---|---|---|---|---|---|---|---|
| | 30 min. | 1 hr. | 3 hrs. | 8 hrs. | 24 hrs. | 72 hrs. | 120 hrs. |
| Treatment of this invention | 10 | 10 | 10 | 8 | 6 | 4 | 1 |
| Treatment by chromic acid | 8 | 4 | 1 | 1 | 1 | 1 | 1 |

| The standard of evaluating mark | Area of red rust formed (%) |
|---|---|
| 10 | 0 |
| 8 | 1–10 |
| 6 | 11–25 |
| 4 | 26–50 |
| 1 | 51–100 |

2. SALT SPRAY TESTS FOR HOT DIP GALVANIZED SHEET 0.27 MM. THICK (percentage of forming white rust)

| | Time | | | | |
|---|---|---|---|---|---|
| | 1 hr. | 8 hrs. | 24 hrs. | 72 hrs. | 120 hrs. |
| Treated in accordance with— | | | | | |
| Example 1 | 10 | 10 | 8 | 6 | 4 |
| Example 2 | 10 | 10 | 10 | 8 | 6 |
| Example 3 | 10 | 10 | 10 | 8 | 6 |
| Prior method (0.5% solution of chromic acid) | 4 | 1 | 1 | 1 | 1 |

| The standard of Evaluation Mark | Area of White Rust Formed (%) |
|---|---|
| 10 | 0 |
| 8 | 1–10 |
| 6 | 26–30 |
| 1 | 51–100 |

3. COMPARATIVE RESULTS ABOUT THE TEST OF ADHESIVENESS OF COATING, 0.27 MM. THICK (paint—baking melamine)

|  | Bending test | Cross cut adhesion test | Scratch and adhesion test | Erichsen test | Impact test |
| --- | --- | --- | --- | --- | --- |
| Treated in accordance with | | | | | |
| Example 1 | 10 | 10 | 10 | 10 | 8 |
| Example 2 | 10 | 10 | 10 | 10 | 8 |
| Example 3 | 10 | 10 | 10 | 10 | 5 |
| Prior method (0.5% solution of chromic acid) | 5 | 1 | 1 | 3 | 1 |

4. COMPARATIVE RESULTS ABOUT THE TEST OF ALUMINIZED STEEL PLATE, 0.8 MM THICK (Paint—Baking melamine)

|  | Bending test | Crosscut adhesion test | Scratch and adhesion test | Erichsen test | Impact test |
| --- | --- | --- | --- | --- | --- |
| Treated in accordance with Example 1 | | 10 | 10 | 10 | 10 |
| Prior method (0.5% solution of chromic acid) | | 5 | 7 | 7 | 10 |

From the above results, it can be noted that the novel process greatly improves corrosion resistance as well as paintability of the plated steel plates over the prior process. Moreover, the formability is excellent because the novel process does not require any electrolytic reduction process or baking process. The novel process can be carried out at a comparable speed with that of prior process. While this invention takes place of prior processes utilizing only chromic acid, there are such advantages that no pretreatment is required and that various chemical treatment may be carried out after the novel treatment.

What is claimed is:

1. A process of surface treatment of a metal comprising the sequential steps of treating said metal with an aqueous treating solution having a pH of from about 2 to 9 consisting essentially of a water-soluble copolymer consisting of itaconic acid and acrylonitrile and a member selected from the group consisting of chromic acid and a chromate, and drying the treated metal, the copolymer constituting at least about 1 percent and said member constituting from about 0.3 to about 5 percent of said solution.

2. The process of claim 1, wherein said drying step is carried out at a temperature of from about 80° to about 200° C.

3. The process of claim 1, wherein said metal is a steel.

4. The process of claim 1, wherein said copolymer comprises from about 40 to about 80 mole percent of itaconic acid and from about 60 to about 20 mole percent of acrylonitrile.

5. The process of claim 1, wherein chromic acid is present in said solution in an amount of from about 0.5 to about 1 percent.

6. The process of claim 1, wherein the temperature of said solution is from about 50° to about 80° C.

7. The process of claim 1, wherein said copolymer constitutes up to about 10 percent of said solution.

* * * * *

UNITED STATES PATENT OFFICE
CERTIFICATE OF CORRECTION

Patent No. 3,630,791    Dated December 28, 1971

Inventor(s)  HIDEHISA YAMAGISHI et al

It is certified that error appears in the above-identified patent and that said Letters Patent are hereby corrected as shown below:

In the Abstract, line 3 - "chromatic" should be "chromic"

Column 1, line 46 - comma (,) before "50-100%" should be semicolon (;)

Column 2, line 22 - insert "55%" after "acrylonitrile"

Column 2, line 32 - after "soda" a parenthesis should be inserted

Signed and sealed this 26th day of September 1972.

(SEAL)
Attest:

EDWARD M. FLETCHER, JR.
Attesting Officer

ROBERT GOTTSCHALK
Commissioner of Patents